3,485,876
VAPOR-PHASE CATALYTIC OXIDATION OF TOLUENE TO BENZALDEHYDE
Theodorus J. van de Mond, Geleen, Netherlands, assignor to Stamicarbon N.V., Heerlen, Netherlands
No Drawing. Filed Nov. 3, 1966, Ser. No. 591,695
Claims priority, application Netherlands, Nov. 12, 1965, 6514682
Int. Cl. C07c 47/54, 63/02; B01j 11/20
U.S. Cl. 260—599
9 Claims

ABSTRACT OF THE DISCLOSURE

A process is described for the vapor-phase oxidative conversion of toluene preferentially to benzaldehyde with molecular oxygen wherein production of by-produce benzoic acid and also total degradative oxidation to carbon dioxide and water are both suppressed while maintaining a retained or enhanced conversion of the toluene to benzaldehyde by the use of, as the catalyst a mixture of silver vanadate with lead vanadate or silver arsenate.

---

This invention relates to the vapor-phase catalytic oxidation of toluene with oxygen or ozone to benzaldehyde. More particularly, the present invention is concerned with such an oxidation carried out in the presence of a catalyst which contains silver vanadate with silver arsenate or a vanadate of lead as the catalytically-active components.

It is known to oxidize toluene catalytically with oxygen or ozone. Further, U.S. Patent No. 1,284,887 teaches for such use as oxidation catalysts, the oxides of aluminum, antimony, bismuth, cerium, chromium, silver, cobalt, magnesium, molybdenum, tin, titanium, tungsten, uranium, vanadium and zinc. Mixtures of these oxides, e.g., a mixture of 93% uranium oxide and 7% molybdenum oxide, with or without a small amount of copper oxide added thereto may also be used, as mentioned in British patent specification No. 189,091. Other catalysts taught in the prior art (see British patent specification No. 156,-245) for the oxidation of toluene are the vanadates, molybdates, chromates, uranates, stannates of copper, silver, lead, thallium, platinum, cerium, nickel and cobalt.

A catalyst is usually evaluated with reference to its activity and selectivity. The activity of a catalyst determines the rate of conversion, i.e., the percentage of starting material which is converted into the product. The selectivity of the catalyst determines the quality of the product, i.e., the percentage of the desired product the product stream obtained by the conversion reaction. Applying these criteria to the catalytic oxidation of toluene to benzaldehyde, it has now appeared that among the catalysts suggested in the prior art, silver vanadate is to be preferred because it combines a reasonably good activity with a particularly good selectivity. Thus, the silver vanadate catalyst tends to convert only a small portion of the oxidized toluene to carbon dioxide, which is of no value, while the remainder of the oxidized toluene is converted substantially entirely to the desired benzaldehyde, and some benzoic acid products. However, the activity and selectivity of the silver vanadate catalyst still leaves much room for improvement.

Therefore, it is an object of the present invention to provide a novel catalyst for the vapor-phase oxidation to toluene to benzaldehyde, having surprisingly good activity and selectivity.

It is a further object of the present invention to provide a novel process for the vapor-phase oxidation of toluene to benzaldehyde.

Still other objects may be gathered from the following description and the appended claims.

It has now been found that the selectivity of the silver vanadate catalyst for the production of benzaldehyde from toluene, can be substantially improved while the activity of the catalyst is held at an approximately constant level by incorporating silver arsenate or a vanadate of lead into the catalyst mass. This increase in selectivity is surprising since a catalyst based on lead vanadate, thallium vanadate or silver arsenate is less active and less selective than a silver vanadate catalyst. Thus, an unpredictable synergistic activity between the silver vanadate component and the silver arsenate or the vanadate of lead is clearly indicated.

An appreciable increase in the selectivity of the silver vanadate catalyst can be realized even with the incorporation of relatively small amounts of silver arsenate or a vanadate of lead. For the purposes of discussion herein, the silver arsenate or lead vanadate or thallium vanadate will be referred to by their metallic component and they will be collectively referred to as the "other metal." In accordance with this definition, a catalyst having a molar ratio of the "other metal" to silver vanadate of, say 1:10, can be advantageously used. However, it has been found that the greatest improvement in the selectivity of the catalyst is generally realized at a molar ratio of "other metal" to silver of about 1:3, although catalysts having relatively higher molar "other metal" to silver ratios, for example, a ratio of 2:1, can also be used to increase the selectivity of silver vanadate in the oxidation reaction indicated.

The components of the catalyst of the present invention should be thoroughly mixed. Preferably, the mixing is carried out by co-precipitation of the catalytic components. It is also preferred to use the catalytic mixture on a carrier material, e.g., on the oxides of aluminum or silicon.

When toluene is oxidized to benzaldehyde, less than the stoichiometric amount of oxygen or ozone is employed to prevent the formation of large amounts of carbon dioxide and water. An optimum result is usually obtained if the molar toluene to oxygen ratio is approximately 2. To improve the selectivity of the oxidation reaction, the gaseous reaction mixture should contain a considerable amount of steam. Optimum results are usually obtained at a toluene to steam molar ratio of about 0.5:1. At toluene/steam molar or volume ratio higher than about 0.5:1, the formation of by-products such as tolyl-benzaldehyde and ditolyl and carbon dioxide increases sharply. Toluene-steam volume ratios lower than 0.5:1 do not adversely affect the activity or the selectivity of the catalyst but the amount of toluene which can be put through a given reactor at these low toluene/steam ratios would be decreased. Thus, for practical and economic reasons the toluene/steam volume ratio is usually kept near 0.5:1.

The space velocity of the gaseous reaction mixture over the catalyst can be varied between wide limits. At a toluene content of approximately 10% by volume of the gaseous reaction mixture, space velocities of, say, 750 to 10,000 liters of gaseous reaction mixture per liter of catalyst per hour may be employed, without adversely affecting the activity or the selectivity of the catalyst. While higher space velocities can be used to increase the total yield of a given reactor, such higher space velocities are usually coupled with slightly lower degrees of conversion.

The products obtained by oxidizing toluene with oxygen or ozone in the presence of a catalyst containing silver vanadate and silver arsenate or lead vanadate contain a very large proportion of benzaldehyde and benzoic acid. The amount of benzaldehyde in the product stream, when the catalyst of the present invention is employed, is almost always about 95% by weight of the total quantity of the aldehydes produced while approximately 80% of the acids produced from the toluene is benzoic acid.

It should be remarked that the oxidation of toluene with oxygen or ozone in the presence of a catalyst containing silver vanadate and a member selected from the class consisting of silver arsenate and lead vanadate as active components may be carried out at a temperature in the range of 300° C. to 500° C.

Below 300° C. the activity of the catalyst will become unduly small whereas over 500° C. too much of the toluene will be converted to the undesired carbon dioxide.

The oxidation products obtained by the process of the present invention may be separated in the usual manner, e.g., by condensation and distillation. After separation from the benzaldehyde and benzoic acid, the unreacted toluene and steam and oxygen may be recycled back into the catalytic converter.

The invention will now be further illustrated with reference to the following examples. Examples 1–3 relate to the use of either silver vanadate or lead vanadate or silver arsenate as the sole catalytically active component in the oxidation of toluene to benzaldehyde. Examples 4–6 show the use of a catalyst according to the present invention, i.e., a catalyst containing both silver vanadate and lead vanadate or silver arsenate. Thus, the surprising and advantageous results obtainable by the process of the present invention are clearly demonstrated.

EXAMPLE 1

(a) A silver vanadate catalyst mass of 50% by weight of $AgVO_3$ and 50% by weight of $SiO_2$ as carrier material was prepared by suspending $SiO_2$ in an ammonium metavanadate solution, adding silver nitrate solution to said suspension, removing the precipitate by filtration and drying and calcining the precipitate.

Toluene was oxidized with this catalyst. A mixture of:

|  | Liters |
| --- | --- |
| Toluene vapor | 6.6 |
| Oxygen | 3.7 |
| Nitrogen | 50 |
| Steam | 13.2 | per hour was passed over 10 ml. of this catalyst. The catalyst mass was kept at 375° C. Under these conditions 13% of the toluene was converted.

The composition of the oxidized toluene was:

|  | Percent |
| --- | --- |
| Aldehyde | 54 |
| Acid | 36 |
| Carbon dioxide | 10 |

(b) Using a catalyst mass prepared in the manner described under part (a), and containing 20% by weight of $AgVO_3$ and 80% by weight $SiO_2$, toluene was oxidized by passing a mixture of:

|  | Liters |
| --- | --- |
| Toluene vapor | 2 |
| Oxygen | 1 |
| Nitrogen | 3 |
| Steam | 12 | per hour over 20 ml. of catalyst. The catalyst mass was kept at 372° C. Under these conditions 14% of the toluene was converted, and the composition of the oxidized toluene was:

|  | Percent |
| --- | --- |
| Aldehyde | 54 |
| Acid | 37 |
| Carbon dioxide | 9 |

EXAMPLE 2

A lead vanadate catalyst mass of 40% by weight of $Pb(VO_3)_2$ and 60% by weight of $SiO_2$ was prepared in the manner described in Example 1, but with a lead nitrate solution being used instead of a silver nitrate solution. The catalyst was tested by passing a gas mixture of the same composition as that in Example 1(b) over 20 ml. of the catalyst at a temperature of 358° C. It was found that 7% of the toluene was converted. The composition of the oxidized toluene was:

|  | Percent |
| --- | --- |
| Aldehyde | 49 |
| Acid | 25 |
| Carbon dioxide | 26 |

EXAMPLE 3

A catalyst mass of 50% by weight of $Ag_3AsO_4$ and 50% by weight of $SiO_2$ was prepared by adding an $AgNO_3$ solution to a suspension of $SiO_2$ in an $Na_2HAsO_4$ solution, removing the precipitate by filtration and drying and calcining the precipitate so obtained.

The catalyst was used at 440° C. by passing the toluene mixture of Example 2 over 20 ml. of the catalyst mass. It was found that 4% of the toluene was converted. The oxidation product was found to contain:

|  | Percent |
| --- | --- |
| Aldehyde | 66 |
| Benzoic acid | 7 |
| Carbon dioxide | 27 |

A comparison of Examples 1 and 2 shows that a lead vanadate catalyst is not as effective as a silver vanadate catalyst, both with respect to the degree of conversion and the selectivity of the catalyst. In addition, the amount of carbon dioxide produced in the oxidation reaction, which is an indication of the amount of toluene lost in the reaction, is considerably higher for the lead vanadate catalyst.

A comparison of Examples 2 and 3 shows an increase in the selectivity for the silver arsenate catalyst but the percentage conversion is much reduced. A comparison of Examples 1 and 3 shows that the percentage conversion for silver arsenate is only a small fraction of that for silver vanadate. Although silver arsenate shows higher selectivity than silver vanadate, the amount of carbon dioxide produced by the silver arsenate catalyst is several times higher than that for silver vanadate catalysts. In addition, the extremely low conversion rate for silver arsenate prevented its use as the catalyst prior to the present invention.

EXAMPLE 4

A catalyst mass containing $AgVO_3$ and $Pb(VO_3)_2$ in the following amounts:

|  | Percent by weight |
| --- | --- |
| $AgVO_3$ | 20 |
| $Pb(VO_3)_2$ | 20 |
| $SiO_2$ | 60 | was prepared by adding solutions of silver nitrate and lead nitrate to a suspension of $SiO_2$ in an ammonium metavanadate solution, removing the precipitate by filtration and drying and calcining the precipitate. This catalyst was employed at 356° C. by passing the gas mixture of Example 2 over 20 ml. of the catalyst mass. The molar Ag/Pb ratio in the catalyst mass was 2:1. It was found that 7% of toluene was converted and the composition of the oxidized toluene was:

|  | Percent |
| --- | --- |
| Aldehyde | 73 |
| Acid | 19 |
| Carbon dioxide | 8 |

EXAMPLE 5

A catalyst mass with a molar Ag/Pb ratio equal to 3.25:1 and containing 50% by weight of $AgVO_3$, 30% by weight of $Pb(VO_3)_2$ and 20% by weight of $SiO_2$ was prepared in the manner described in Example 4 and employed at 444° C. under the conditions mentioned in Example 1(a). The toluene converted is now found to be 12% and the composition of the oxidized toluene was as follows:

| | Percent |
|---|---|
| Aldehyde | 73 |
| Acid | 25 |
| Carbon dioxide | 2 |

EXAMPLE 6

A catalyst mass containing 50% by weight of $AgVO_3$, 20% by weight of $Ag_3AsO_4$ and 30% by weight of $SiO_2$, i.e., with a molar Ag/As ratio equal to 8.8:1, was prepared by adding solutions of disodium arsenate and silver nitrate to a suspension of $SiO_2$ in a solution of ammonium metavanadate, removing the precipitate by filtration and drying and calcining the precipitate.

The catalyst mass was used at 370° C., the other conditions being equal to those described in Example 2. It was found that about 10% of the toluene was converted. The composition of the oxidized toluene was found to be:

| | Percent |
|---|---|
| Aldehyde | 60 |
| Acid | 34 |
| Carbon dioxide | 6 |

The operating conditions and results of the reactions described in the examples are summarized in the following table. It can be seen from this table that a considerable higher yield of aldehyde can be obtained with the improved catalyst of the invention. In every example where the catalyst of the present invention was employed, the amount of $CO_2$ produced is much lower than the $CO_2$ produced in the other examples. These examples clearly show that the use of the catalyst of the present invention results in higher yields of aldehyde and lower losses of toluene through combustion to carbon dioxide.

The invention has been described in detail with particular reference to preferred embodiments thereof, but it will be understood that variations and modifications may be effected within the spirit and scope of the invention as described hereinabove and as defined in the appended claims.

What is claimed is:

1. In processes for the vapor-phase catalytic oxidation of toluene with oxygen or ozone to benzaldehyde, the improvement consists essentially in carrying out the oxidation reaction in the presence of a catalyst composed of silver vanadate and a member selected from the class consisting of silver arsenate and lead vanadate, as the catalytically active components.

2. A process according to claim 1 wherein the molar ratio between silver vanadate and the other catalytically active component in said catalyst is between about 10:1 and 1:2.

3. A process according to claim 1 wherein the catalyst is prepared by co-precipitation of the catalytically active components from an aqueous solution.

4. A process according to claim 2 wherein said catalyst is a mixture of silver vanadate and silver arsenate.

5. A process according to claim 2 wherein said catalyst is a mixture of silver vanadate and lead vanadate.

6. A catalyst mass composed of a mixture of silver vanadate and a second catalytically active component selected from the group consisting of silver arsenate and lead vanadate, wherein the molar ratio of silver vanadate to said second component present is about 10:1 and 1:2.

7. A catalyst mass according to claim 6 further containing a carrier material for supporting said mixture.

8. A catalyst mass according to claim 7 wherein said mixture is a mixture of silver vanadate and silver arsenate.

9. A catalyst mass according to claim 7 wherein said mixture is a mixture of silver vanadate and lead vanadate.

TABLE

| Example | Catalyst | Temp., °C. | Space Velocity of Gas Mixture, Liters/Liter of Catalyst/A.R. | Toluene Oxygen Volume Ratio | Toluene Steam Volume Ratio | Conversion, Percent | Yield of Aldehyde [1] | Yield of Acid [1] | Combustion to $CO_2$ [1] |
|---|---|---|---|---|---|---|---|---|---|
| 1a | 50 wt. percent $AgVO_3$ 50 wt. percent $SiO_2$ | 375 | 7,350 9% toluene | 1.8:1 | 1:2 | 13 | 54 | 36 | 10 |
| 1b | 20 wt. percent $AgVO_3$ 80 wt. percent $SiO_2$ | 372 | 900 11.1% toluene | 2:1 | 1:6 | 14 | 54 | 37 | 9 |
| 2 | 40 wt. percent $Pb(VO_3)_2$ 60 wt. percent $SiO_2$ | 358 | 900 11.1% toluene | 2:1 | 1:6 | 7 | 49 | 25 | 26 |
| 3 | 50 wt. percent $Ag_3AsO_4$ 50 wt. percent $SiO_2$ | 440 | 900 11.1% toluene | 2:1 | 1:6 | 4 | 66 | 7 | 27 |
| 4 | 20 wt. percent $AgVO_3$ 20 wt. percent $Pb(VO_3)_2$ 60 wt. percent $SiO_{21}$ | 356 | 900 11.1% toluene | 2:1 | 1:6 | 7 | 73 | 19 | 8 |
| 5 | 50 wt. percent $AgVO_3$ 30 wt. percent $Pb(VO_3)_2$ 20 wt. percent $SiO_2$ | 444 | 7,350 9% toluene | 1.8:1 | 1:2 | 12 | 73 | 25 | 2 |
| 6 | 50 wt. percent $AgVO_3$ 20 wt. percent $Ag_3AsO_4$ 30 wt. percent $SiO_2$ | 370 | 900 11.1% toluene | 2:1 | 1:6 | 10 | 60 | 34 | 6 |

[1] As percent of converted toluene.

References Cited

UNITED STATES PATENTS

| | | | |
|---|---|---|---|
| 1,871,117 | 8/1932 | Day | 252—462 |
| 1,945,267 | 1/1934 | Fiedler et al. | 252—456 X |
| 2,289,036 | 7/1942 | Parks et al. | 260—524 |
| 3,012,043 | 12/1961 | Dowden et al. | 252—456 X |
| 3,258,433 | 6/1966 | Lambert et al. | 252—454 |

FOREIGN PATENTS 964,552    7/1964    Great Britain.

DANIEL E. WYMAN, Primary Examiner

C. F. DEES, Assistant Examiner

U.S. Cl. X.R.

252—454, 456, 461, 476; 260—524